US006915683B2

(12) United States Patent
Schoeffel et al.

(10) Patent No.: US 6,915,683 B2
(45) Date of Patent: Jul. 12, 2005

(54) METHOD, COMPUTER PROGRAM, AND DEVICE FOR MEASURING THE AMOUNT INJECTED BY AN INJECTION SYSTEM

(75) Inventors: Eberhard Schoeffel, Bamberg (DE); Hans Braun, Stuttgart (DE); Josef Seidel, Breitenguessbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,880

(22) PCT Filed: Mar. 5, 2002

(86) PCT No.: PCT/DE02/00777

§ 371 (c)(1),
(2), (4) Date: May 5, 2003

(87) PCT Pub. No.: WO02/070996

PCT Pub. Date: Sep. 12, 2002

(65) Prior Publication Data

US 2003/0177823 A1 Sep. 25, 2003

(30) Foreign Application Priority Data

Mar. 6, 2001 (DE) ........................................ 101 10 649

(51) Int. Cl.[7] .............................................. G01M 15/00
(52) U.S. Cl. ..................................................... 73/119 A
(58) Field of Search ............................... 73/116, 117.2, 73/117.3, 118.1, 119 A, 119 R

(56) References Cited

U.S. PATENT DOCUMENTS 4,798,084 A * 1/1989 Takahashi et al. ........ 73/119 A
4,858,466 A 8/1989 Takahashi et al.
5,657,736 A * 8/1997 Maki et al. ................. 123/673
5,801,308 A * 9/1998 Hara ........................... 73/223
6,189,377 B1 * 2/2001 Schoeffel et al. ......... 73/119 A
2003/0110846 A1 * 6/2003 Schoeffel et al. .......... 73/118.1
2003/0140686 A1 * 7/2003 Bindel et al. ............ 73/119 A
2003/0150259 A1 * 8/2003 Unger et al. .............. 73/119 A
2003/0177817 A1 * 9/2003 Unger et al. ................... 73/37

FOREIGN PATENT DOCUMENTS

DE 40 41 509 A 6/1992
EP 0967389 * 12/1999 ................ 73/118.1
JP 61 001862 A 1/1986
JP 01 063649 A 3/1989
JP 01 063650 A 3/1989
JP 01 063840 A 3/1989

* cited by examiner

*Primary Examiner*—Eric S. McCall
(74) *Attorney, Agent, or Firm*—Ronald E. Greigg

(57) ABSTRACT

For measuring the injection quantity (Vm) of injection systems (18), in particular in internal combustion engines, test fluid (22) is injected by the injection system (18) into a measurement chamber (12). To increase the precision and stability of the measurement, the volume of the measurement chamber (12) is kept constant during the injection. Moreover, a gas volume (Vg) is present in the measurement chamber (12). The injected volume (Vm) of test fluid (22) is ascertained from the pressure change (dP) in the measurement chamber (12) that occurs upon an injection of test fluid (22). The ascertainment of the injected volume (Vm) is done by means of the state equation for ideal gases.

19 Claims, 1 Drawing Sheet

METHOD, COMPUTER PROGRAM, AND DEVICE FOR MEASURING THE AMOUNT INJECTED BY AN INJECTION SYSTEM

CROSS-REFERENCE TO RELATED APPLICATIONS

This application is a 35 USC 371 application of PCT/DE 02/00777, filed on Mar. 5, 2002.

BACKGROUND OF THE INVENTION

1. Field of the Invention

The present invention relates first to a method for measuring the injection quantity of injection systems, in particular in internal combustion engines, in which a test fluid is injected by the injection system into a measurement chamber.

2. Deascription of the Prior Art

One method known on the market uses an apparatus known as an EMI (injection quantity indicator). This indicator comprises a housing, in which a piston is guided. The interior of the housing and the piston define a measurement chamber. The measurement chamber has an opening against which an injection nozzle can be placed in a pressure-tight fashion. If the injection nozzle injects fuel into the measurement chamber, a fluid located in the measurement chamber is positively displaced. As a result, the piston moves, which is detected by a travel sensor. From the travel of the piston, a conclusion can be drawn about the change in volume of the measurement chamber, or in the fluid contained in it, and as a result about the injected fluid quantity.

The known method already functions with very high precision. Especially in internal combustion engines, however, more and more injection systems are being used that inject very tiny injection quantities, and in which the injections comprise a plurality of partial injections in rapid succession. In measuring such injections, even more-precise detection of the injection quantities may be wanted.

The present invention therefore has the object of refining a method of the type defined at the outset such that even the tiniest injection quantities can be measured with high precision. Even injections in rapid succession should be measurable with high reliability.

In a method of the type defined at the outset, this object is attained in that the volume of the measurement chamber is constant during the injection; a gas volume, preferably an air volume is present in the measurement chamber; and the injected volume of test fluid is ascertained, by means of the state equation for ideal gases, from the pressure change in the measurement chamber that results upon an injection.

SUMMARY OF THE INVENTION

The method of the invention is based on the concept that the injected test fluid is essentially incompressible. The injected test fluid is normally a test oil, which especially if injection systems of internal combustion engines are to be tested has physical properties that are equivalent to those of fuel, such as Diesel fuel or gasoline. Since the total volume of the measurement chamber is constant during the injection, the gas volume located in the measurement chamber is reduced upon an injection by the volume of the injected test fluid. This reduction in the gas volume results in an increase in the pressure in the gas volume (and thus also in the volume of the test fluid). However, such a change in the pressure in the measurement chamber can easily be detected. Fmm the detected pressure change, it is then possible with the aid of the state equation for ideal gases to ascertain the applicable change in volume.

Thus in the method of the invention, the volume of the injected test fluid is ascertained solely on the basis of simple physical relationships, without requiring any moving parts for performing the method. This results in high measurement speed and furthermore freedom from wear in performing the method. Mistakes in the outcome of measurement that are caused in the prior art by the vibrations of the piston mass, for instance, are precluded in the method of the invention. Thus even the tiniest injection quantities, which are injected in rapid succession into the measurement chamber, can be detected and determined with high precision.

In one refinement, before an injection, the volume of the measurement chamber, closed off in gastight fashion, is varied by a defined amount, and from the resultant pressure change, the gas volume in the measurement chamber is ascertained. This refinement is based on the concept that the gas volume in the measurement chamber is generally known only approximately, since for instance test fluid ejected in previous injections is still present in the measurement chamber, and therefore the gas volume is usually not equivalent to the measurement chamber volume. A complete evacuation of the measurement chamber before an injection can be accomplished only at major effort and expense in the normal situation.

With the refinement of the method of the invention, however, it is possible before an injection to determine the volume of gas in the measurement chamber very precisely and in the simplest possible way. To that end, the volume of the measurement chamber is varied by a certain, that is, defined and exactly known, amount, for instance by means of a displaceable piston. Since the measurement chamber is closed off in gastight fashion and the test fluid in the measurement chamber is incompressible, the reduction in volume of the measurement chamber causes a compression of the gas volume located in the measurement chamber, and an attendant pressure increase. From this increase, using the state equation for ideal gases and the pressure in the gas volume before the reduction in volume, the volume of the gas can then be ascertained. With this precisely determined volume in the measurement chamber, a further improvement in the measurement precision is possible.

Still further improvement in the measurement precision is possible whenever the temperature of the gas and/or of the test fluid in the measurement chamber is detected and taken into account in ascertaining the injected volume of test fluid. Although in principle, it can be assumed that the temperature in the measurement chamber remains approximately constant upon an injection, nevertheless in reality, upon an injection, a change in this temperature occurs. This is essentially associated with two physical effects, namely first the conversion of the kinetic energy of the injected test fluid into heat, and second, an adiabatic temperature increase in the gas volume in the measurement chamber because of the pressure increase. If the temperature of the injected test fluid and/or of the gas present in the measurement chamber is detected, this can be taken into account in the state equation for ideal gases, and as a result the measurement precision can be still more markedly improved.

Measuring the absolute temperature of the gas and/or of the test fluid in the measurement chamber with conventional systems, however, is possible only with a certain time lag, since these systems do not respond immediately to temperature changes. It is therefore proposed in a refinement of the method of the invention that a temperature increase of the injected test fluid be ascertained from the difference between the pressure that prevails in the injection system and the pressure in the measurement chamber. In this refinement, accordingly, by a simple calculation, at least the temperature increase of the injected test fluid that occurs because of the conversion of the kinetic energy of the test fluid into heat is taken into account. Such a calculation can be performed at high speed, so that corresponding high-precision measurement results are immediately available.

It is especially preferred that the measurement chamber is flushed with a gas, preferably air, before a measurement. As a result, a large gas volume in the measurement chamber is created, which is also favorable for the measurement range.

In another refinement of the method of the invention, the flow of fluid in the injection is made uniform and/or slowed down. This makes it possible to damp pressure fluctuations, caused for instance by pressure waves.

It is also proposed that the measurement chamber includes a wire mesh. By means of this wire mesh, the injected fluid is atomized, and the temperature compensation is speeded up.

Moreover, the pressure change caused by the temperature increase and fading over time can be described by an exponential statement. In the simplest form, it can be assumed that the temperature increase is proportional to the observed pressure increase; that is, that each (differential) pressure increase comprises one component that is constant in terms of percentage and is due to the reduction in volume of the measurement chamber from the (differentially) introduced fluid volume, as well as a component, also constant in terms of percentage, that is caused by the temperature increase and fades exponentially over time, with a course that is characteristic for the measurement chamber.

Outside the injection event, the course that fades over time can be measured directly, since no reduction in volume in the measurement chamber is caused by injections. In this region, the time constant can therefore be determined along with the percentage of the pressure increase caused by the increase in the temperature. With the aid of this exponential statement the pressure increase caused solely by the injection of the test fluid can be derived readily, without further assumptions, simply by computation.

Since the exponential function includes no periodic components whatever, no overswings or other periodic phenomena occur. The resolution over time of the reduction in volume in the measurement chamber caused by the volume of the injected fluid is therefore equivalent to the detection over time of the measurement chamber pressures.

The invention also pertains to a computer program that is suitable for performing the above method, when it is performed on a computer. It is especially preferred if the computer program is stored in a memory, in particular a flash memory.

The invention also relates to an apparatus for measuring the injection quantity of injection systems, in particular in internal combustion engines, having a measurement chamber and a connecting device, by means of which an injection system can be made to communicate with the measurement chamber; having a pressure sensor, which detects the pressure in the measurement chamber; and having a processing device, which processes the measurement signal furnished by the pressure sensor.

Such an apparatus corresponds to the injection quantity indicator (EMI) referred to at the outset that is known on the market. To increase the measurement precision of such an apparatus, especially at small injection quantities and where injections occur in rapid succession, it is proposed that the measurement chamber is embodied such that its volume can be kept constant during the injection; a gas volume, preferably an air volume, is present in the measurement chamber; and the processing device is embodied such that it ascertains the injected volume of test fluid from the measurement signal of the pressure sensor before and after the injection, by means of the state equation for ideal gases.

With such an apparatus, the method of the invention referred to above can be performed especially well and reliably. It is advantageous here that the apparatus need not contain any parts that are moved mechanically during the measurement of the injection quantity. In this sense, the apparatus of the invention means a departure from the aforementioned EMI, with a measurement chamber volume that is variable during an injection. The result is a very high measurement speed as well as freedom from wear of the apparatus of the invention. Furthermore, the apparatus of the invention can easily be adapted to corresponding measurement problems, and because of the lack of moving parts, it can also be produced relatively inexpensively.

In a refinement of the apparatus of the invention, it is proposed that it includes a piston, which is displaceable in a defined manner and which regionally defines the measurement chamber. With this piston, the volume of the measurement chamber can be varied by a determined amount, causing a pressure change in the gas in the measurement chamber. From this pressure change, in turn, the gas volume in the measurement chamber can be ascertained. During an injection, the piston is stationary.

Preferably, the apparatus includes a gas supply, preferably a compressed-air source, which can be made to communicate with the measurement chamber. With such a gas supply, the measurement chamber can be flushed before the measurement of an injection quantity is done, and as a result, the gas volume available in the measurement is at a maximum, which in turn increases the measurement precision in a measurement.

It is also proposed that the apparatus includes a porous body, preferably a sintered body, which is disposed such that eddies in the measurement chamber upon an injection of test fluid are averted. This is based on the recognition that given the high injection speed of modern injection systems, eddies in the gas and the test fluid can occur in the measurement chamber, which can cause disruptions in measuring the pressure. If, however, as proposed according to the invention, a porous body is suitably disposed, then such eddies can be averted, making the pressure measurement more stable and precise. It is also possible for the entire measurement chamber to be embodied in the porous body. Moreover, a wire mesh or a wad of long lathe chips may be present in the measurement chamber, which because of its large surface area can damp pressure waves especially well.

In a preferred refinement, the apparatus includes a temperature sensor, which detects the temperature of the gas and/or of the fluid in the measurement chamber. In this way, the temperature of the gas and/or of the fluid can be taken into account in using the state equation for ideal gases, which further increases the precision of the ascertainment of the volume of the injected test fluid.

Finally, it is especially preferred that the processing device of the apparatus is provided with a computer program as referred to above.

BRIEF DESCRIPTION OF THE DRAWINGS

Below, two exemplary embodiments of the invention are described in detail, in conjunction with the accompanying drawing. Shown in the drawing are.

DESCRIPTION OF THE PREFFERRED EMBODIMENTS

Figure 1:
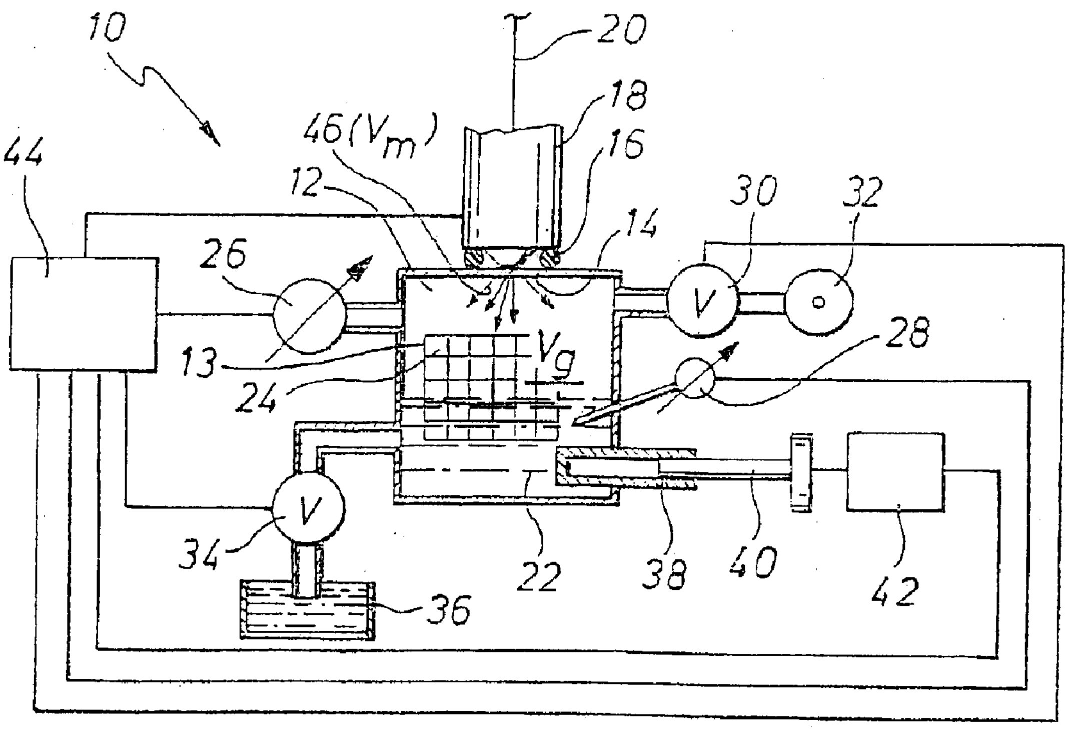
FIG. 1: a schematic side view, partly in section, of a first exemplary embodiment of an apparatus for measuring the injection quantity of injection systems.

In FIG. 1, an apparatus for measuring the injection quantity of injection systems is identified overall by reference numeral 10. It includes a measurement chamber 12, which at its top has an opening 14 that is in turn provided with a sealing ring 16. An injection system, in the present case an injection nozzle 18 of an injector, is placed on this sealing ring in pressuretight and fluidtight fashion. The injection nozzle 18 communicates with a high-pressure test fluid supply 20.

The lower region, in terms of FIG. 1, of the measurement chamber 12 is filled with a test fluid 22. This is a test oil, whose physical properties are equivalent to those of fuel. The upper region, in terms of FIG. 1, of the measurement chamber 12 is filled with an ideal gas, in the present case air 24. The region of the measurement chamber 12 where the air 24 is present forms a gas volume Vg. A tie line (without a reference numeral) also branches off from the upper left-hand region of the measurement chamber 12 and is in communication with a pressure sensor 26. The temperature Tg in the measurement chamber 12 is detected by a temperature sensor 28. A further tie line (without a reference numeral) branches from the upper right-hand region of the measurement chamber 12 in FIG. 1 and communicates via a valve 30 with a compressed-air source 32.

The lower region of the measurement chamber 12 that is filled with test fluid 22 can be made to communicate, via a third tie line (without a reference numeral) and a valve 34, with an outlet 36. In its lower region in terms of FIG. 1, the measurement chamber 12 is also defined by a piston 38, which can be introduced into and retracted from the measurement chamber 12, through the wall of the measurement chamber 12, via a piston rod 40. The motion of the piston 38 or the piston rod 40 is effected by a control motor 42. By way of this motor, the piston 38 can also be blocked in a specified position.

The injection nozzle 18, pressure sensor 26, temperature sensor 28, valves 30 and 34, and the control motor 42 communicate electrically with a control and processing device 44. The control and processing device 44 controls the operation of the entire apparatus 10. It furthermore ascertains the volume of the quantity of test fluid (arrows 46 in FIG. 1) injected by the injection nozzle 18 from the measurement signal of the pressure sensor 26, which corresponds to the pressure in the measurement chamber 12, and from the measurement signal of the temperature sensor 28, which corresponds to the temperature in the measurement chamber 12.

The control and processing device 44 includes a flash memory (without a reference numeral), in which a computer program is stored. By means of the computer program, the apparatus 10 is controlled by the following method:

First, the valve 34 is opened by the control and processing device 44, and the injection nozzle 18 is triggered in such a way that a greater quantity of test fluid (arrows 46) is injected into the measurement chamber 12. After the injection by the injection nozzle 18 has been terminated, the valve 30 is opened by the control and processing device 44, as a result of which the measurement chamber 12 is flushed with compressed air. The test fluid 22 and the inflowing compressed air (without a reference numeral) are diverted into the outlet 36 via the open valve 34. In this way, the gas volume Vg located in the measurement chamber 12 is maximized.

Now the two valves 30 and 34 are closed by the control and processing device 44. Since despite the flushing of the measurement chamber 12 with compressed air not all the residues of test fluid can be removed from the measurement chamber 12, and therefore the actual gas volume Vg in the measurement chamber 12 is not yet known, this gas volume is now ascertained as follows:

The control motor 42 is triggered by the control and processing device 44 in such a way that the piston 38, via the piston rod 40, is moved inward into the measurement chamber 12 by a precisely defined distance. To prevent leakage problems through the gap between the piston 38 and the wall of the measurement chamber 12, the inner wall of the measurement chamber 12 can also be formed at this point by a highly elastic diaphragm against which the piston 38 presses. Also instead of a piston, the wall of the measurement chamber 12 can have a bulge, which can be moved back and forth between two terminal positions past a dead center point by a control element.

Because of the motion of the piston 38 into the measurement chamber 12 by a defined distance, the volume in the measurement chamber 12 is reduced in a defined way (the diameter of the piston 38 can be assumed to be known): This volumetric reduction dV is equivalent to the distance by which the piston 38 has moved, multiplied by the area of the piston 38. Since the valves 30 and 34 are closed, the measurement chamber 12 is closed off in gastight fashion overall. Since it can be assumed that the test fluid is incompressible, the volumetric reduction dV in the measurement chamber 12 causes a pressure increase dP in the gas volume Vg, which is detected by the pressure sensor 26. Since the change in volume, that is, the speed at which the piston 38 is moved, is relatively slight, it can be assumed that during the volumetric reduction in the measurement chamber 12, the temperature in the gas volume remains constant. Thus in accordance with the state equation for ideal gases, the volume Vg of the air 24 in the measurement chamber 12 before the volumetric reduction dV is $$Vg=dV\cdot(Pg+dP)/dP.$$

Since the volumetric reduction dV is known, the actual volume Vg of the gas 24 can now also be determined from the volumetric reduction dV. The actual measurement of the volume Vm of the test fluid 22 injected by the injection nozzle 18 can now be made. To that end, the injection nozzle 18 is triggered accordingly by the control and processing device 44. Since the test fluid 22 injected into the measurement chamber 12 by the injection nozzle 18 is incompressible, the injection causes a reduction in the available gas volume Vg in the measurement chamber 12, by the amount of injected test fluid volume Vm.

The pressure Pg before the beginning of the injection and the pressure after the end of the injection are detected by the pressure sensor 26, and signals accordingly are carried to the control and processing device 44. From the two pressures detected, the pressure difference dP can be calculated. The temperature 28 detects a temperature Tg that prevails in the measurement chamber 12 before the beginning of the injection by the injection nozzle 18, and the corresponding temperature Tg2 which prevails in the measurement chamber 12 after the end of the injection by the injection nozzle 18 is detected. The injected volume Vm of test fluid is now obtained by the following equation:

$$Vm=Vg\cdot(Pg\cdot Tg2-(Pg+dP)\cdot Tg1)/Tg1/(Pg+dP).$$

During the actual measurement of the injected volume Vm of test fluid 22, no parts are accordingly moved in the apparatus 10. The ascertainment of the injected volume Vm is done exclusively by measuring physical state variables within the measurement chamber 12. The result is a very high measurement speed and a very high resolution. With the apparatus 10, it is thus possible to measure even very small injection quantities and injections that occur in rapid succession. After a measurement campaign or operation, the measurement chamber 12 is again flushed, by opening the valves 30 and 34, and after the closure of the valves 30 and 34, the gas volume Vg in the measurement chamber 12 is ascertained by displacement of the piston 38. A new measurement operation with a new injection nozzle 18 can then be performed.

Since the temperature sensor 28 has a certain inertia, the temperature Tg2 after an injection can also be calculated by approximation. The point of departure for this is a starting temperature Tg1 and a temperature difference dT that is calculated as follows:

The test fluid 22 injected into the measurement chamber 12 by the injection nozzle 18 generally has a very high kinetic energy. On the assumption that the injected quantity Vm is injected into the measurement chamber 12 through a relatively short injection nozzle 18 and that the pressure Ph in the high-pressure test fluid supply 20 is known, the kinetic energy of the volume Vm injected by the injection nozzle 18 is obtained as follows:

$$Ekin=Vm\cdot(Ph-Pe).$$

The temperature increase of the injected volume element Vm of density ρ, effected by the conversion of the kinetic energy into heat, is thus obtained by the equation $$dT=(Ph-Pg)/\rho\cdot cp.$$

This increase in the temperature of the volume element Vm injected into the measurement chamber 12 by the injection nozzle 18 is taken into account, using the signals furnished by the pressure sensor 26, in the control and processing device 44, thus still further increasing the measurement precision in the determination of the injected quantity Vm of test fluid 22.

In a very effective way, the pressure increase brought about temporarily by the increase in the temperature can be described by a fading exponential function. Since the temperature increase is caused by the injection of the test fluid 22 into the measurement chamber 12, it can be assumed that this temperature increase is proportional to the volume Vm of the injected fluid. This is true particularly whenever the kinetic energy Ekin of the injected volume Vm is converted into a temperature increase as rapidly as possible, and the temperature in the measurement chamber 12 is compensated for as rapidly as possible. To this end, in FIG. 1 the measurement chamber 12 is filled up with a wire mesh 13. This wire mesh 13 assures on the one hand that the injected fluid volume Vm is atomized into very fine droplets and brought to a standstill, and on the other, it establishes a thermally very intimate contact between the fluid and the gas filling.

The following statement assumes that the proportion of the pressure increase that fades over time can be approximated by an exponential function (with a time constant), and that this proportion can be described by the measured pressure change dP and a constant scale factor b. The exponential function is assumed to be $c^n$, where c is a number described by 0<c<1, and n is the number of pressure values P(n) (at equal time intervals). The number n corresponds to a time.

The value of the constant c can be derived from the course of fading outside the ejections. This means that the observed pressure change dP=P(n)−P'(n−1) is composed of one component (1−b)*[P(n)−P'(n−1)], which remains constant and corresponds to the volume change as a result of the injection, and one component b*[P(n)−P'(n−1)], which overtime n decreases to zero in accordance with the exponential function $c^n$. P'(n−1) is the previous measured pressure value, recalculated to the instant of the pressure value P(n).

The change over time in a measured pressure thus depends on the previous pressure changes and on the time interval since these pressure changes.

Accordingly, the following is true:

The pressure P(n−1) was measured at time n−1. At time n when the pressure P(n) is measured, P(n−1) has decreased to $$P'(n-1)=P(n-1)-\text{delta}P,$$

where deltaP=

$$b*\text{sum}[(P(i)-P'(i-1))*c^{(n-1-i)}]*(1-c)$$

$$i=1\ldots n-1$$

The terms $b*[(P(i)-P'(i-1)]*c^{(n-1-i)}$ of the sum are the time-dependent pressure components of the ejection at time i, calculated upward to the instant (n−1). The factor (1−c) corresponds to the change from the instant (n−1) to the instant n.

Outside the ejections, there is no pressure increase from an injected volume; that is, in this region, the observed fading over time matches the fading in the above sum. From this equality, the scale factor b can be derived.

In practice, the statement of an exponential function for describing the time-dependent components of the pressure increases is confirmed. Outside the ejections, chronologically constant pressure courses for the non-time-dependent component result. Within the ejections, the statement furnishes the true course of the (differential) pressure changes caused by the injection. Since the exponential function contains no periodic components whatever, no overswings or other periodic phenomena occur in the calculated (differential) volume changes.

The statement therefore furnishes the volume change within the ejections with the chronological resolution at which the pressures P(n) in the measurement chamber 12 were detected. The chronologically fading component of the pressure increase in the measurement chamber 12 is originally caused by the injected test fluid. Thus, however, this component is in principle a measure for the introduced volume Vm and can therefore also be used to derive the volume Vm.

Because of the temperature increase dT, an increase in the vapor pressure within the test fluid 22 also occurs. In typical test fluids, however, up to a test fluid temperature of about 200° C., this increase in the vapor pressure is so slight that it has no substantial effect on the precision of the measurement outcome and hence need not be taken into consideration. Because of the pressure increase in the measurement chamber 12, an adiabatic temperature increase in the gas 24 present is also brought about. Because of the fine distribution of the test fluid 22 injected into the measurement chamber 12 by the injection nozzle 18 and because of the total turbulence in the gas 24 together with all the test fluids 22 present, however, it can be assumed that the gas 24 in the measurement chamber 12, at every moment, assumes the temperature of the test fluid 22.

The outcome of measurement can furthermore be varied by dissolving gas, such as air, in the test fluid 22. The proportion of air bubbles in the injected test fluid 22 can amount to as much as 9%. If air also gets into the test fluid 22 in the course of the compression, then the proportion of air is correspondingly higher. However, the effect of air dissolved in the test fluid 22 is less, the higher the measurement chamber pressure Pg. To attain a high measurement precision, it is therefore advantageous always to employ a relatively high pressure Pg in the measurement chamber 12

Figure 2:
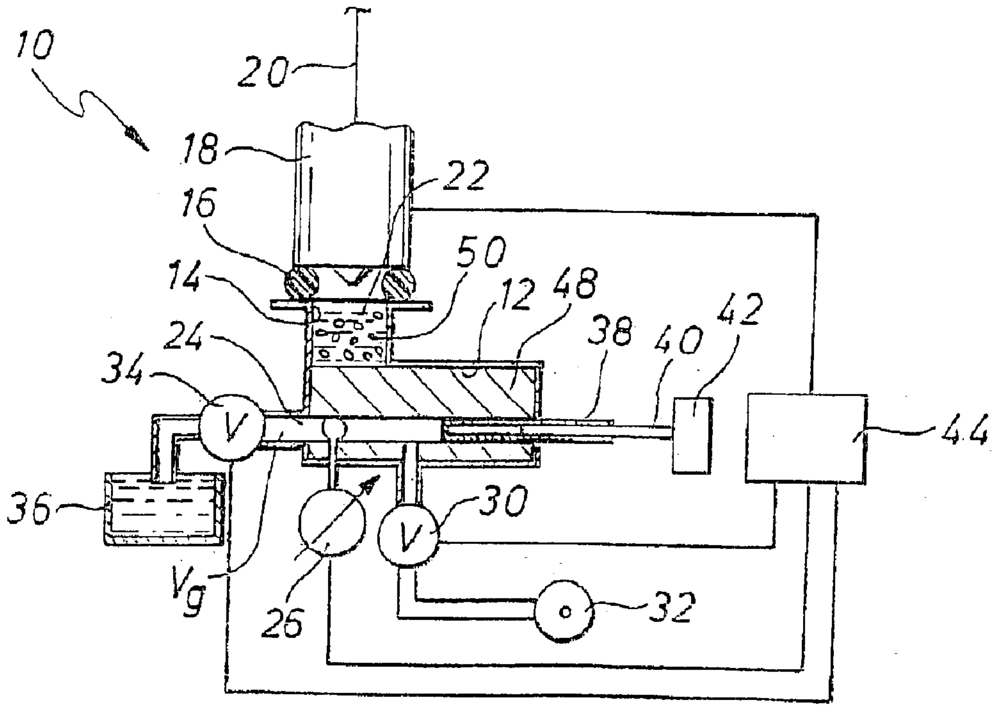
FIG. 2: a view similar to FIG. 1 of a second exemplary embodiment of an apparatus for measuring the injection quantity of injection systems.

FIG. 2 will now be described, in which a second exemplary embodiment of an apparatus 10 for measuring the injection quantity of injection systems is shown. In FIG. 2, those parts that have equivalent functions to those in the first exemplary embodiment, carry the same reference numerals. They will not be described again here in detail.

In a distinction from the first exemplary embodiment shown in FIG. 1, a sintered body 48 is present in the measurement chamber 12. The reason for this is as follows:

Because of the high injection speed in the injection of test fluid 22 through the injection nozzle 18, eddies could occur in the measurement chamber 12, which can interfere with the measurement of the pressure by the pressure sensor 26 or can even damage this sensor. Moreover, because of the sharp injection pulses, pressure waves in the fluids can occur. Such pressure waves could in particular impair the stability of the measurement, so that the outcome of measurement is available with the requisite precision only after a certain resting period after an injection. This is disadvantageous, especially where injections occur in rapid succession.

If now, as in the exemplary embodiment shown in FIG. 2, a sintered body 48 is disposed between the injection nozzle 18 and the pressure sensor 26, then the test fluid 22 injected by the injection nozzle 18 is made uniform, which stabilizes the measurement of the pressure by the pressure sensor 26. In the part of the measurement chamber 12 located above the sintered body 48, wads of long lathe chips 50 are present, by which the pressure waves are reduced or damped.

It should also be pointed out that in FIG. 2, the region located above the sintered body 48 is filled with test oil 22, while conversely the air volume Vg is formed in the sintered body 48 itself. This layering is made possible by the capillary action of the sintered body 48.

Otherwise, the apparatus 10 of FIG. 2 operates by the same principle as the apparatus 10 shown in FIG. 1.

The foregoing relates to preferred exemplary embodiments of the invention, it being understood that other variants and embodiments thereof are possible within the spirit and scope of the invention, the latter being defined by the appended claims.

We claim:

1. A method for measuring the injection quantity (Vm) of injection systems (18) in internal combustion engines, in which an essentially incompressible test fluid (22) is injected by the injection system (18) into a measurement chamber (12), the method comprising, maintaining the volume of the measurement chamber (12) constant during the injection;

providing a gas volume, preferably an air volume (Vg) in the measurement chamber (12); and ascertaining the injected volume (Vm) of test fluid (22) by means of the state equation for ideal gases, from the pressure change (dP) of the gas volume present in the measurement chamber (12) that results upon an injection.

2. The method of claim 1 wherein, before an injection, the volume of the measurement chamber (12), closed off in gas tight fashion, is varied by a defined amount, and from the resultant pressure change, the gas volume (Vg) in the measurement chamber (12) is ascertained.

3. The method of claim 1 wherein the temperature (Tg) of the gas (24) and/or of the test fluid (22) in the measurement chamber (12) is detected and taken into account in ascertaining the injected volume (Vm) of test fluid (22).

4. The method of claim 2 wherein the temperature (Tg) of the gas (24) and/or of the test fluid (22) in the measurement chamber (12)is detected and taken into account in ascertaining the injected volume (Vm) of test fluid (22).

5. The method of claim 1 wherein a temperature increase (dT) of the injected test fluid (22) is ascertained from the difference between the pressure (Pg) that prevails in the injection system and the pressure (Ph) in the measurement chamber (12).

6. The method of claim 1 wherein the measurement chamber (12) is flushed with a gas, preferably air, before a measurement.

7. The method of claim 1 wherein the flow of test fluid in the injection is made uniform and/or slowed down.

8. The method of claim 1 wherein the measurement chamber (12) includes a wire mesh (13).

9. The method of claim 1 wherein the pressure increase, caused by a temperature increase in the measurement chamber (12), is described by an exponential function, which is proportional to the injected volume (Vm) or to the measured pressure change (dP).

10. A computer program suitable for performing the method of claim 1 when it is executed on a computer.

11. The computer program of claim 10 stored in a memory, in particular a flash memory.

12. An apparatus for measuring the injection quantity of injection systems (18) in internal combustion engines, comprising a measurement chamber (12) containing a volume (Vg) of gas, preferably air, and a connecting device (16), by means of which an injection system (18) for an essentially incompressible test fluid can be made to communicate with the measurement chamber (12);

a pressure sensor (26), which detects the pressure (Pg) of the aas volume in the measurement changer (12); and a processing device (44), which processes the measurement signal furnished by the pressure sensor (26), the measurement chamber (12) being embodied such that its volume can be kept constant during the injection; and the processing device (44) being embodied such that it ascertains the injected volume (Vm) of test fluid (22) from the measurement signal of the pressure sensor (26) before and after the injection, by means of the state equation for ideal gases.

13. The apparatus of claim 12 further comprising a piston (38), which is displaceable in a defined manner and which regionally defines the measurement chamber (12).

14. The apparatus of claim 13 further comprising a gas supply, preferably a compressed-air source (32), which can be made to communicate with the measurement chamber (12).

15. The apparatus of claim 13 further comprising a gas supply, preferably a compressed-air source (32), which can be made to communicate with the measurement chamber (12).

16. The apparatus of claim 13 further comprising a porous body, preferably a sintered body (48), which is disposed such that eddies in the measurement chamber (12) upon an injection of test fluid (22) are averted.

17. The apparatus of claim 16 wherein the measurement chamber (12) is embodied in the porous body (48).

18. The apparatus of claim 13 further comprising a temperature sensor (28), which detects the temperature (Tg) of the gas and/or of the fluid in the measurement chamber (12).

19. The apparatus of claim 13 wherein the processing device (44) further comprising a computer program for controlling operation of the apparatus to measure the injection quantity by means of the stable equation for ideal gases from the pressure change (dP) in the measurement chamber (12) upon an injection.

* * * * *